US010501071B2

(12) United States Patent
Takasu et al.

(10) Patent No.: US 10,501,071 B2
(45) Date of Patent: Dec. 10, 2019

(54) CONTROL DEVICE OF HYBRID VEHICLE

(71) Applicant: TOYOTA JIDOSHA KABUSHIKI KAISHA, Toyota-shi, Aichi (JP)

(72) Inventors: Yusuke Takasu, Toyota (JP); Kenji Gotoda, Nagakute (JP); Hiroki Kuwamoto, Toyota (JP); Taku Harada, Nisshin (JP); Akira Nakata, Toyota (JP); Tomoya Takeuchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/265,005

(22) Filed: Feb. 1, 2019

(65) Prior Publication Data
US 2019/0232949 A1 Aug. 1, 2019

(30) Foreign Application Priority Data
Feb. 1, 2018 (JP) .................................. 2018-016800

(51) Int. Cl.
*B60W 20/17* (2016.01)
*B60W 10/06* (2006.01)
*B60W 10/08* (2006.01)
*B60K 6/22* (2007.10)

(52) U.S. Cl.
CPC .............. *B60W 20/17* (2016.01); *B60K 6/22* (2013.01); *B60W 10/06* (2013.01); *B60W 10/08* (2013.01); *B60W 2710/0666* (2013.01); *B60W 2710/083* (2013.01); *B60Y 2200/92* (2013.01)

(58) Field of Classification Search
CPC ...... B60W 20/17; B60W 10/06; B60W 10/08; B60W 2710/0666; B60W 2710/083; B60K 6/22
USPC ............................................. 701/22; 180/381
See application file for complete search history.

(56) References Cited

U.S. PATENT DOCUMENTS

| 2012/0152670 A1* | 6/2012 | Chauvet ................ | F16F 9/0481 |
| | | | 188/266.2 |
| 2015/0020773 A1* | 1/2015 | Tsukada ................ | F02D 41/042 |
| | | | 123/376 |
| 2018/0134278 A1 | 5/2018 | Gotoda | |

FOREIGN PATENT DOCUMENTS

JP 2016-107673 A 6/2016

* cited by examiner

*Primary Examiner* — Isaac G Smith
(74) *Attorney, Agent, or Firm* — Oliff PLC

(57) ABSTRACT

In a control device of a hybrid vehicle including an engine and an electric motor serving as drive power sources and a damper device disposed between the engine and the electric motor and having rotational characteristics related to an input torque, the control device comprises: a damper rotational characteristic detecting portion configured to measure a rotational characteristic value of the damper device by allowing the electric motor to input a torque to the damper device while rotation of a crankshaft of the engine is stopped; and an output torque correction control portion configured to control an output torque of the engine or the electric motor to suppress occurrence of vibration based on a difference between the rotational characteristic value of the damper device detected by the damper rotational characteristic detecting portion and a preset initial setting value of the rotational characteristic value of the damper device.

10 Claims, 10 Drawing Sheets

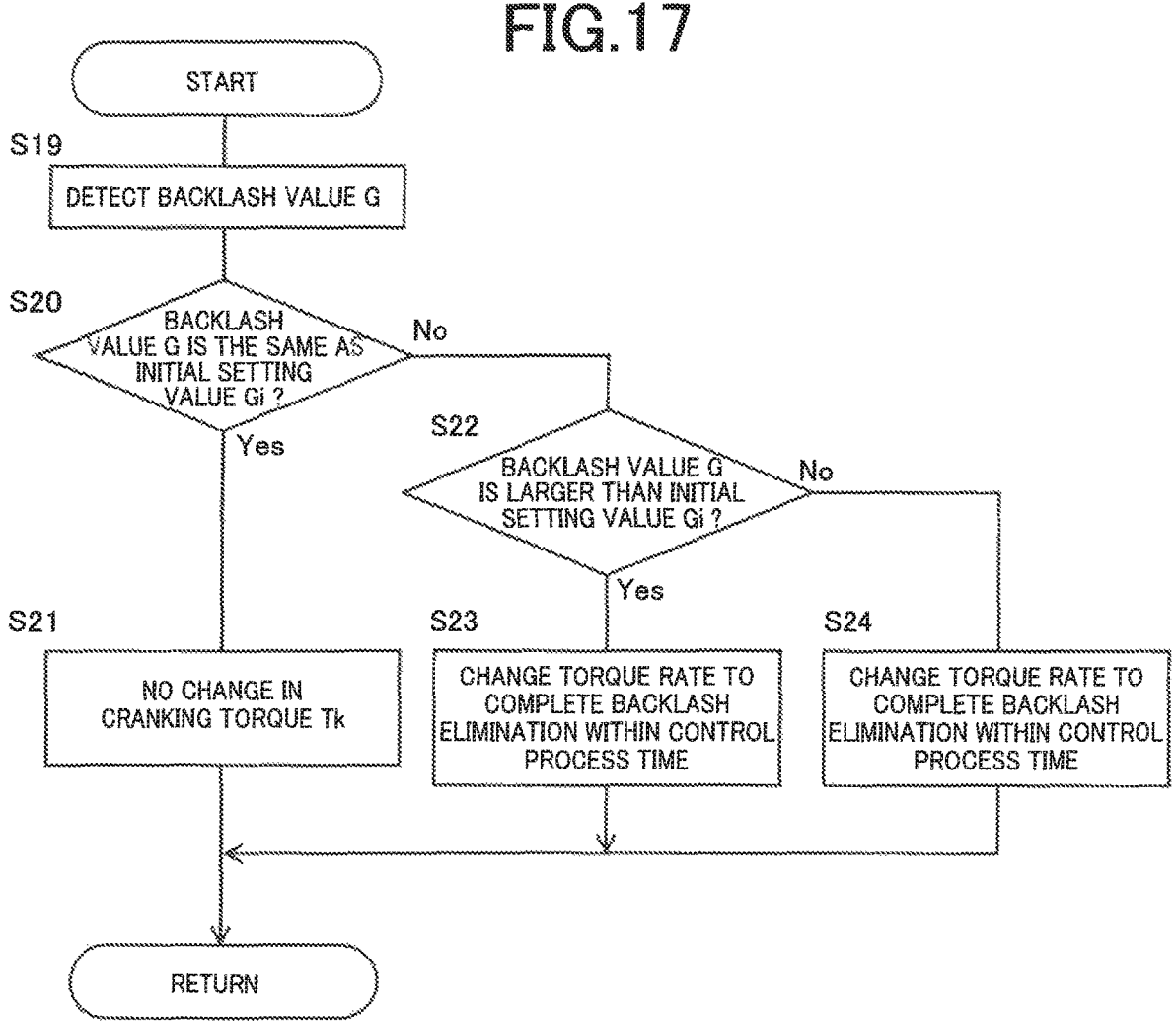

CONTROL DEVICE OF HYBRID VEHICLE

This application claims priority from Japanese Patent Application No. 2018-016800 filed on Feb. 1, 2018, the disclosure of which is herein incorporated by reference in its entirety.

BACKGROUND OF THE INVENTION

Field of the Invention

The present invention relates to a control device of a hybrid vehicle and, more particularly, to a technique of maintaining drivability by changing an engine torque or a motor torque at the time of starting or driving an engine in accordance with a change in characteristics of a damper device etc. to suppress a tooth-hitting noise (gear rattle noise).

Description of the Related Art

There is known a hybrid vehicle including an engine and an electric motor serving as drive power sources and a damper device disposed between the engine and the electric motor and having rotational characteristics related to an input torque. The damper device is a device transmitting power through an elastic member so as to absorb rotational vibration of the engine, for example, and the rotational characteristics correspond to a rigidity corresponding to a change in twist angle relative to a change in the input torque, a hysteresis value that is a difference in the input torque when the twist angle increases and decreases, a backlash value that is a change amount of the twist angle at the time of reversal between positive and negative in the input torque, etc. In some cases, power performance, vibration, noise, etc. are affected by the rotational characteristics of the damper device. Therefore, efforts are made to improve power performance, vibration, noise, etc. based on the rotational characteristics in terms of both hardware and control. For example, in Patent Document 1, to prevent resonance from occurring in a vehicle due to rigidity of a damper device when an electric motor is used as a drive power source for running, a technique is proposed for changing a torque of the electric motor so as to change the rigidity value of the damper device based on a relationship between the input torque and the rigidity value of the damper device.

CITATION LIST

Patent Document 1: Japanese Laid-Open Patent Publication No. 2016-107673

SUMMARY OF THE INVENTION

Technical Problem

Since a relationship between the input torque and the rigidity value of the damper device varies depending on component variation and temporal deterioration, an actual relationship may deviate from a preset relationship. Therefore, if an output torque of a drive power source is controlled in accordance with the preset relationship based on a rotational characteristic value, the drive power source is controlled while a deviation from the actual relationship remains, so that a desired effect is not obtained for suppression of occurrence of vibration such as a rattling noise and a tooth-hitting noise, and/or suppression of vibrations such as an engine start shock, etc., which may result in deterioration in drivability.

The present invention was conceived in view of the situations and it is therefore an object of the present invention to suppress deterioration in drivability by properly providing control based on a rotational characteristic value of a damper device regardless of a change in the rotational characteristic value.

Problem to Solution

To achieve the above object, a first aspect of the present invention provides a control device of a hybrid vehicle including (a) an engine and an electric motor serving as drive power sources and a damper device disposed between the engine and the electric motor and having rotational characteristics related to an input torque, the control device comprising: (b) a damper rotational characteristic detecting portion measuring a rotational characteristic value of the damper device by allowing the electric motor to input a torque to the damper device while rotation of a crankshaft of the engine is stopped; and (c) an output torque correction control portion controlling an output torque of the drive power source to suppress occurrence of vibration based on a difference between the rotational characteristic value of the damper device detected by the damper rotational characteristic detecting portion and a preset initial setting value of the rotational characteristic value of the damper device.

A second aspect of the present invention provides the control device of a hybrid vehicle recited in the first aspect of the invention, wherein the hybrid vehicle includes an engine-side rotating element fixing device stopping rotation of an engine-side rotating element of the damper device, and wherein the damper rotational characteristic detecting portion measures the rotational characteristic value of the damper device by allowing the electric motor to input a torque while the engine-side rotating element of the damper device is fixed to the engine-side rotating element fixing device.

A third aspect of the present invention provides the control device of a hybrid vehicle recited in the first or second aspect of the invention, wherein the rotational characteristic value of the damper device is any one of a rigidity value that is a rate of a twist angle to an input torque of the damper device, a hysteresis value of the twist angle for the input torque, and a backlash value indicative of a dead zone of the twist angle for the input torque.

A fourth aspect of the present invention provides the control device of a hybrid vehicle recited in the third aspect of the invention, wherein when the rigidity value is larger than the preset initial setting value, the output torque correction control portion decreases the output torque of the engine with the rotation speed of the engine kept constant, and wherein when the rigidity value is smaller than the preset initial setting value, the output torque correction control portion increases the output torque of the engine with the rotation speed of the engine kept constant.

A fifth aspect of the present invention provides the control device of a hybrid vehicle recited in the third aspect of the invention, wherein when the hysteresis value is larger than the preset initial setting value, the output torque correction control portion reduces an initial explosion correction torque output from the electric motor for starting the engine during electric-motor running, and wherein when the hysteresis value is smaller than the preset initial setting value, the output torque correction control portion increases the initial explosion correction torque output from the electric motor for starting the engine during the electric-motor running.

A sixth aspect of the present invention provides the control device of a hybrid vehicle recited in the third aspect of the invention, wherein when the backlash value is larger than the preset initial setting value, the output torque correction control portion makes a torque increase rate of a cranking torque output from the electric motor larger, so that a backlash of the damper device is eliminated smoothly and cranking is performed as quickly as possible at the time of start of the engine, and wherein when the backlash value is smaller than the preset initial setting value, the output torque correction control portion makes the torque increase rate of the torque output from the electric motor smaller.

Advantageous Effects of Invention

According to the control device of the hybrid vehicle recited in the first aspect of the invention, the output torque correction control portion controls the output torque of the drive power source to suppress occurrence of vibration such as the tooth-hitting noise and the engine start shock based on a difference between the rotational characteristic value of the damper device and the preset initial setting value of the rotational characteristic value of the damper device. As a result, regardless of a change in the rotational characteristic value of the damper device, the occurrence of vibration such as the tooth-hitting noise and the engine start shock is suppressed, and a deterioration in vehicle drivability is suppressed.

According to the control device of the hybrid vehicle recited in the second aspect of the invention, the hybrid vehicle includes the engine-side rotating element fixing device stopping rotation of the engine-side rotating element of the damper device, and the damper rotational characteristic detecting portion measures the rotational characteristic value of the damper device by allowing the electric motor to input a torque while the input-side rotating element of the damper device is fixed to the engine-side rotating element fixing device. As a result, the rotational characteristic value of the damper device is accurately measured.

According to the control device of the hybrid vehicle recited in the third aspect of the invention, the rotational characteristic value of the damper device is any one of the rigidity value that is a rate of the twist angle to the input torque of the damper device, the hysteresis value of the twist angle for the input torque, and the backlash value indicative of a dead zone of the twist angle for the input torque, and therefore, the control is properly provided based on the rotational characteristic value regardless of a change in any of the rigidity value, the hysteresis value, and the backlash value of the damper device.

According to the control device of the hybrid vehicle recited in the fourth aspect of the invention, when the rigidity value is larger than the preset initial setting value, the output torque correction control portion decreases the output torque of the engine with the rotation speed of the engine kept constant, and when the rigidity value is smaller than the preset initial setting value, the output torque correction control portion increases the output torque of the engine with the rotation speed of the engine kept constant. As a result, even if the rigidity value of the damper device changes, the occurrence of the rattling noise and tooth-hitting noise is suppressed, and preferable fuel consumption of the vehicle is achieved.

According to the control device of the hybrid vehicle recited in the fifth aspect of the invention, when the hysteresis value is larger than the preset initial setting value, the output torque correction control portion reduces the initial explosion correction torque output from the electric motor for starting the engine during electric-motor running of the vehicle, and when the hysteresis value is smaller than the preset initial setting value, the output torque correction control portion increases the initial explosion correction torque. As a result, even if the hysteresis value of the damper device changes, an appropriate engine start torque is obtained, so that the initial explosion of the engine is properly performed without an engine start shock.

According to the control device of the hybrid vehicle recited in the sixth aspect of the invention, when the backlash value is larger than the preset initial setting value, the output torque correction control portion makes the torque increase rate of the torque output from the electric motor larger, so that the backlash of the damper device is eliminated smoothly and cranking of the engine is performed as quickly as possible at the time of start of the engine, and when the backlash value is smaller than the preset initial setting value, the output torque correction control portion makes the torque increase rate of the torque output from the electric motor smaller, so that the backlash of the damper device is eliminated before starting the engine. As a result, even if the backlash value of the damper device changes, the engine is started after the backlash is eliminated smoothly and as quickly as possible, so that the engine can smoothly be started.

BRIEF DESCRIPTION OF DRAWINGS

FIG. 17 is a flowchart for explaining main portions of an example of the control operation of the electronic control device of FIG. 1.

DESCRIPTION OF THE PREFERRED EMBODIMENTS

Figure 1:
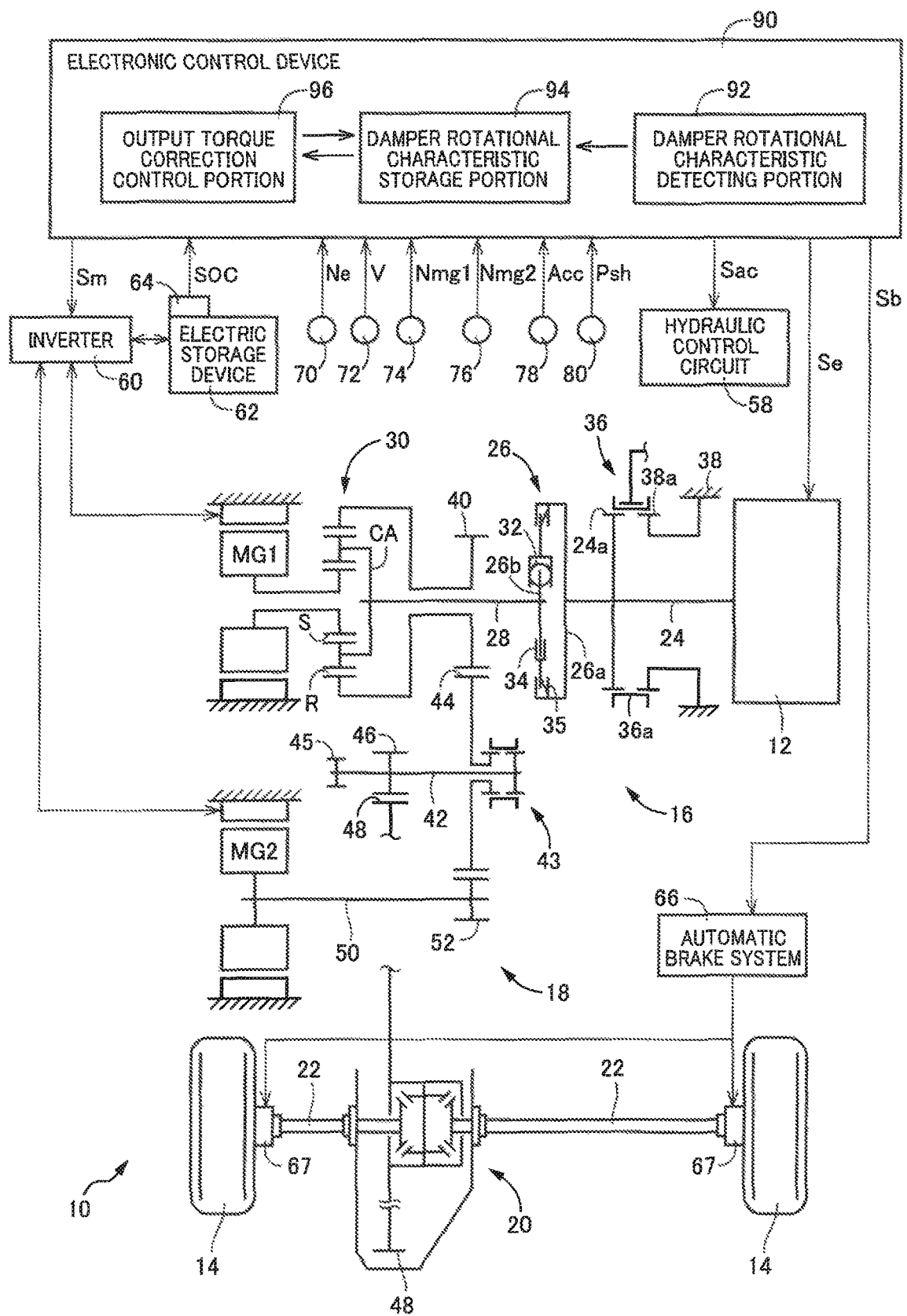
FIG. 1 is a skeleton diagram for explaining a drive system of a hybrid vehicle to which the present invention is applied, showing main portions of the control system together.

The engine is an internal combustion engine generating power from combustion of a fuel such as a gasoline engine and a diesel engine. For the electric motor, a motor generator also usable as an electric generator is suitably used. A rotational characteristic value of a damper device is a rigidity value corresponding to a change in twist angle relative to a change in input torque, a hysteresis value that is a difference in the input torque when the twist angle increases and decreases, or a backlash value that is a change amount of the twist angle at the time of reversal between positive and negative in the input torque, and the present invention is applied when a predetermined torque control is provided to improve vibration, noise, etc. based on any one of the rotational characteristic values.

For an engine-side rotating element fixing device disposed on an engine-side rotating element of the damper device and stopping the rotation of the engine-side rotating element, a friction brake of a hydraulic type etc., a meshing brake, or a one-way clutch etc. is suitably used.

The damper rotational characteristic detecting portion desirably continuously stores (learns) the rotational characteristic value, for example, while a vehicle is stopped with the engine stopped and a vehicle speed being zero or may detect the value during motor running in which a second electric motor is used as a drive power source for running with the engine stopped. Regarding timing of the detection, the value may be learned at the time of vehicle inspection or may periodically be learned based on a predetermined running distance or a running time, and other various forms are available. If temporal changes have a large influence, it is desirable to periodically repeatedly detect the value based on certain conditions.

If a drive power is generated due to the detection of the rotational characteristic value, it is desirable to control torque of the second electric motor to offset the drive power; however, in the case of learning of the rotational characteristic value during stop of the vehicle, for example, the learning may be performed on condition that a depressing operation of a brake is performed, that a shift lever is operated to a P (parking) position to put a parking gear into an engaged state, or that a parking brake is in operation. If the vehicle includes an automatic brake system which automatically controls a brake force of a wheel brake, the wheel brake may be actuated. If a drive power fluctuation including that detected during running of the vehicle is slight, or in the case of the learning before the shipment of the vehicle or during vehicle inspecting, the offset control of the drive power may be omitted. The offset control may not necessarily completely eliminate the drive power fluctuation, and the drive power fluctuation is may be reduced.

The present invention is applied to, for example, a hybrid vehicle having a differential mechanism distributing an output of an engine to an electric motor and a driving wheel side and may be applied to various vehicles such as a one-motor hybrid vehicle having an engine and an electric motor connected in series across a rotating member such as a damper device and a hybrid vehicle transmitting outputs of an engine and an electric motor combined by a planetary gear device etc. toward driving wheels. A transmission gear and a connecting/disconnecting device such as a clutch etc. may be disposed as needed between the engine and the damper device as well as between the damper device and the electric motor. If the engine and the damper device are directly coupled via a coupling shaft etc., the engine-side rotating element fixing device prevents reverse rotation of the engine-side rotating element of the damper device, i.e., the crankshaft of the engine, and the damper rotational characteristic detecting portion applies a torque in the reverse rotation direction to the damper device; however, if the connecting/disconnecting device is disposed between the engine and the damper device, the direction of the rotation of the damper device to be prevented is not particularly limited. If rotation is prevented in both directions by the engine-side rotating element fixing device, the direction of the torque applied to the damper device is not necessarily limited at the time of measurement of the rotational characteristic value by the damper rotational characteristic detecting portion. The rotational characteristics can be obtained also by changing the torque in both positive and negative directions.

Example

An example of the present invention will now be described in detail below with reference to the drawings.

FIG. 1 is a skeleton diagram for explaining a drive system of a hybrid vehicle 10 to which the present invention is applied, showing main portions of the control system together. The hybrid vehicle 10 has, for example, a transversely-mounted drive system of an FF (front-engine front-wheel drive) type etc. and includes in a power transmission path between an engine 12 and a pair of left and right driving wheels 14, a first drive portion 16, a second drive portion 18, a final reduction gear 20, a pair of left and right axles 22, etc.

The engine 12 is an internal combustion engine such as a gasoline engine and a diesel engine and has a crankshaft 24 to which a damper device 26 absorbing a torque fluctuation is coupled. The damper device 26 includes an input-side rotating element 26a coupled to the crankshaft 24 and an output-side rotating element 26b coupled via an input shaft 28 to a differential mechanism 30 with multiple types of springs 32 and a friction mechanism 34 interposed between the input-side rotating element 26a and the output-side rotating element 26b, so that a rigidity value (spring constant) K corresponding to a rate of a change in twist angle $\Phi$ to a change in input torque Tin is changed stepwise while a predetermined hysteresis value H is provided between when the twist angle $\Phi$ increases and when the twist angle $\Phi$ decreases.

A torque limiter 35 is disposed on an outer circumferential end portion of the damper device 26. The damper device 26 has a backlash value G indicative of a dead zone of the twist angle $\Phi$ for the input torque Tin as a rotational characteristic value.

The crankshaft 24 integrally coupled to the input-side rotating element 26a is coupled to a housing 38 via a meshing brake 36 so that rotation is prevented. The meshing brake 36 has meshing teeth 24a disposed on the crankshaft 24, meshing teeth 38a disposed on the housing 38, and a meshing sleeve 36a having an inner circumferential surface provided with meshing teeth which mesh simultaneously with both the meshing teeth 24a, 38a, and the meshing sleeve 36a is moved in an axial direction so that the crankshaft 24 is switched between a state in which the crankshaft 24 is relatively non-rotatably engaged with the housing 38 and a state in which the crankshaft 24 is released from the housing 38 and made freely rotatable.

For example, an electromagnetic switching valve etc. disposed in a hydraulic control circuit 58 is switched in accordance with a hydraulic control signal Sac supplied from an electronic control device 90, so that the meshing sleeve 36a is moved in the axial direction via a hydraulic cylinder etc. to engage and release the meshing brake 36. Alternatively, the meshing sleeve 36a can be moved in the axial direction by using another drive device such as an electric feed screw mechanism. The meshing brake 36 is provided with a synchronizing mechanism of a cone type etc. as needed. The meshing brake 36 acts as to an input-side rotating element fixing device, and instead of the meshing brake 36, a friction brake or a one-way clutch which prevents the engine 12 from rotating in only the reverse rotation direction can be employed as the rotation lock mechanism. An engine connecting/disconnecting clutch which enables/disenables power transmission can be disposed between the engine 12 and the meshing teeth 24a.

The first drive portion 16 is configured to include a first electric motor MG1 and an output gear 40 in addition to the engine 12, the differential mechanism 30, and the meshing brake 36. The differential mechanism 30 is a single pinion type planetary gear device and includes a sun gear S, a ring gear R, and a carrier CA as three rotating elements in a differentially rotatable manner; the first electric motor MG1 is coupled to the sun gear S; the input shaft 28 is coupled to the carrier CA; and the output gear 40 is coupled to the ring gear R.

Therefore, a torque transmitted from the engine 12 via the damper device 26 to the carrier CA of the differential mechanism 30 is distributed by the differential mechanism 30 to the first electric motor MG1 and the output gear 40, and when a rotation speed (MG1 rotation speed) Nmg1 of the first electric motor MG1 is controlled through regenerative control etc., a rotation speed (engine rotation speed) Ne of the engine 12 is continuously variably changed and output from the output gear 40. Therefore, the differential mechanism 30 and the first electric motor MG1 function as an electric continuously variable transmission. The first electric motor MG1 alternatively functions as an electric motor or an electric generator and is connected through an inverter 60 to an electric storage device 62.

On the other hand, when the first electric motor MG1 is rotationally driven in a negative rotation direction opposite to a running direction of the engine 12 while the rotation of the crankshaft 24 is prevented by the meshing brake 36, i.e., while a rotation of the carrier CA is prevented via the damper device 26, a torque is applied to the output gear 40 in the positive rotation direction (vehicle forward direction) same as the running direction of the engine 12 due to a reaction force generated by the meshing brake 36, and the output gear 40 is rotationally driven in the positive rotation direction. When the first electric motor MG1 is rotationally driven in the positive rotation direction same as the running direction of the engine 12, a torque is applied to the output gear 40 in the reverse rotation direction (vehicle reverse direction) opposite to the running direction of the engine 12 due to a reaction force generated by the meshing brake 36, and the output gear 40 is rotationally driven in the reverse rotation direction. In such a case, a torque Tm1 of the first electric motor MG1 is amplified depending on a gear ratio $\rho$ of the differential mechanism 30 and applied to the damper device 26 coupled to the carrier CA. The first electric motor MG1 is an electric motor which applies a torque to the damper device 26 via the differential mechanism 30.

Figure 2:
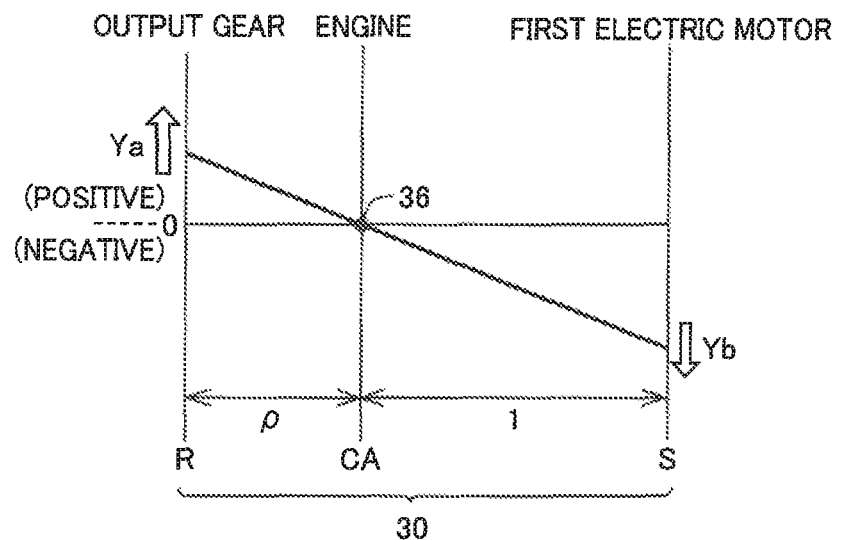
FIG. 2 is a collinear chart of a differential mechanism of the hybrid vehicle of FIG. 1.

FIG. 2 is a collinear chart in which the three rotating elements of the differential mechanism 30, i.e., the sun gear S, the ring gear R, and the carrier CA, can be connected by a straight line in terms of rotation speed; the upward direction of FIG. 2 is the running direction of the engine 12, i.e., the positive rotation direction; and intervals among the vertical axes are determined depending on the gear ratio $\rho$ (=the number of teeth of the sun gear S/the number of teeth of the ring gear R) of the differential mechanism 30. For example, describing a case that the output gear 40 is rotationally driven in the vehicle forward direction by the first electric motor MG1, a torque of rotation in the negative rotation direction (the downward direction of FIG. 2) opposite to the running direction of the engine 12 is applied to the sun gear S as indicated by an arrow YA through a power running control of the first electric motor MG1 while the rotation of the carrier CA is prevented by the meshing brake 36, and when the sun gear S is rotationally driven in the negative rotation direction, a torque of rotation in the positive rotation direction (the upward direction of FIG. 2) same as the running direction of the engine 12 is applied as indicated by an arrow YB to the ring gear R to which the output gear 40 is coupled, so that a drive power is obtained in the forward direction.

Returning to FIG. 1, the output gear 40 is meshed with a large diameter gear 44 disposed on an intermediate shaft 42 parallel to the input shaft 28. A dog clutch 43 is disposed between the large diameter gear 44 and the intermediate shaft 42 so that a power transmission is selectively switched between to be enabled and disenabled. This dog clutch 43 is configured in the same way as the meshing brake 36, for example and has an engaged state and a disengaged state switched therebetween via a hydraulic cylinder etc. when another electromagnetic switching valve etc. disposed in the hydraulic control circuit 58 is switched in accordance with the hydraulic control signal Sac supplied from the electronic control device 90, so that the power transmission is enabled and disenabled between the large diameter gear 44 and the intermediate shaft 42.

A small diameter gear 46 smaller in diameter than the large diameter gear 44 is disposed on the intermediate shaft (counter shaft) 42, and the small diameter gear 46 is meshed with a differential ring gear 48 of the final reduction gear 20. Therefore, the rotation of the output gear 40 is reduced in speed depending on a ratio of the numbers of teeth between the output gear 40 and the large diameter gear 44 and a ratio of the numbers of teeth between the small diameter gear 46 and the differential ring gear 48 and transmitted to the final reduction gear 20 and is further transmitted from the pair of the axles 22 to the driving wheels 14 through a differential gear mechanism of the final reduction gear 20. A parking gear 45 is relatively non-rotatably disposed on the intermediate shaft 42, and when a parking range is selected by operation of a shift lever to a P position for parking etc., a parking lock pawl not shown is pressed against and meshed with the parking gear 45 in accordance with an urging force of a spring etc. so as to prevent rotation of members on the driving wheel 14 side from the intermediate shaft 42.

The second drive portion 18 is configured to include a second electric motor MG2 and a motor output gear 52 disposed on a motor shaft 50 of the second electric motor MG2, and the motor output gear 52 is meshed with the large diameter gear 44. Therefore, a rotation speed (MG2 rotation speed Nmg2) of the second electric motor MG2 is reduced depending on a ratio of the number of teeth between the motor output gear 52 and the large diameter gear 44 and a ratio of the number of teeth between the small diameter gear 46 and the differential ring gear 48 and transmitted to the final reduction gear 20 to rotationally drive the driving wheels 14 via the pair of the axles 22. The second electric motor MG2 alternatively functions as an electric motor and an electric generator and is connected through the inverter 60 to the electric storage device 62. The second electric motor MG2 corresponds to a second electric motor usable as a drive power source.

The hybrid vehicle 10 also includes an automatic brake system 66. The automatic brake system 66 electrically controls a brake force i.e. a brake hydraulic pressure, of each of wheel brakes 67 disposed on the pair of driving wheels 14 and a pair of driven wheels (non-driving wheels) not shown in accordance with a brake control signal Sb supplied from the electronic control device 90. The wheel brake 67 is also supplied with a brake hydraulic pressure via a brake master cylinder when a brake pedal not shown is depressed, so that a brake force is mechanically generated depending on the brake hydraulic pressure, i.e., a brake operating force.

The hybrid vehicle 10 having the drive system configured as described above includes the electronic control device 90 as a controller providing various controls such as an output control of the engine 12, a torque control of the first and second electric motors MG1, MG2, an engagement/release control of the meshing brake 36 and the dog clutch 43, a control of automatic braking by the automatic brake system 66. The electronic control device 90 includes a so-called microcomputer having a CPU, a RAM, a ROM, an input/output interface, etc. and executes a signal process according to a program stored in advance in the ROM, while utilizing a temporary storage function of the RAM to provide the various controls.

The electronic control device 90 is supplied with signals indicative of various pieces of information required for control such as the engine rotation speed Ne (rpm), a vehicle speed V (km/h), the MG1 rotation speed Nmg1 (rpm), the MG2 rotation speed Nmg2 (rpm), an accelerator operation amount Acc (%), a shift lever operation position Psh, and an electric storage remaining amount SOC (%) of the electric storage device 62, from an engine rotation speed sensor 70, a vehicle speed sensor 72, an MG1 rotation speed sensor 74, an MG2 rotation speed sensor 76, an accelerator operation amount sensor 78, a shift position sensor 80, and an SOC sensor 64, respectively, for example. Examples of the shift lever operation position Psh include a D position for forward running, an R position for reverse running, the P position for parking, and an N position for neutral, and when the parking range is selected by operation to the P position, the parking lock pawl is meshed with the parking gear 45 disposed on the intermediate shaft 42 so that rotation of the parking gear 45 is mechanically prevented.

The electronic control device 90 outputs, for example, an engine control signal Se for controlling an engine output through an electronic throttle valve, a fuel injection device, an ignition device, etc. of the engine 12, a motor control signal Sm for controlling torques (power running torque and regenerative torque) of the first and second electric motors MG1 and MG2, the hydraulic control signal Sac switching the meshing brake 36 and the dog clutch 43 between engaged and disengaged states via the electromagnetic switching valve etc. of the hydraulic control circuit 58, and the brake control signal Sb controlling the brake force of the wheel brake 67 via the automatic brake system 66.

The electronic control device 90 corresponds to a vehicle control device of the present invention and functionally includes a damper rotational characteristic detecting portion 92, a damper rotational characteristic storage portion 94, and an output torque correction control portion 96 to provide a predetermined control for improving vibration, noise, etc. based on a rigidity, a hysteresis value, or a backlash value that is a characteristic of the damper device 26.

Figure 3:
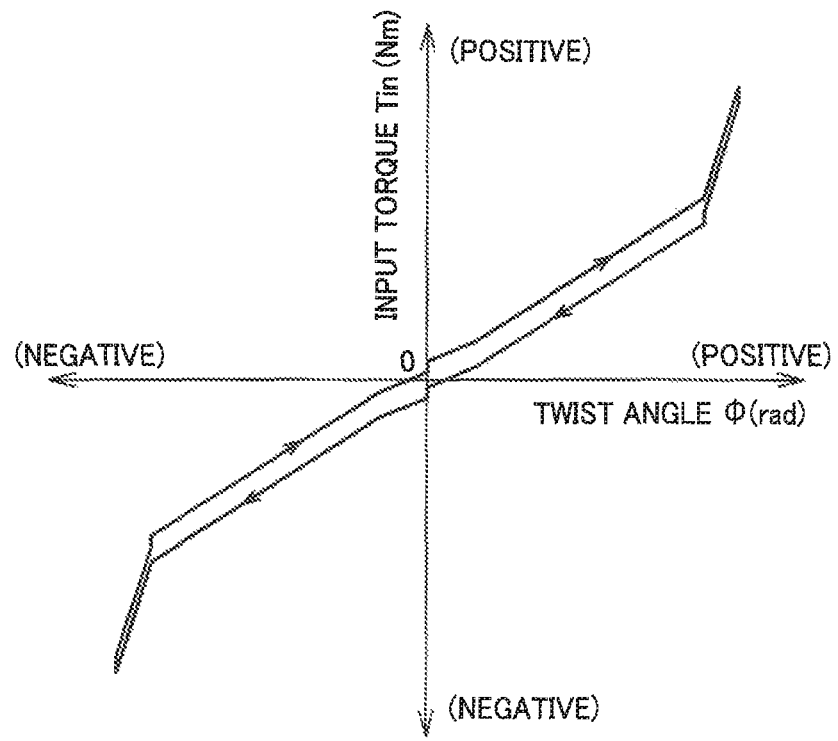
FIG. 3 is a diagram of an example of a relationship between an input torque and a twist angle of a damper device of FIG. 1.

The damper device 26 has a relationship between the input torque Tin to the damper device 26 and the twist angle Φ, for example, as shown in FIG. 3, due to the action of the springs 32 and the friction mechanism 34 etc. Although FIG. 3 shows a symmetric change with respect to an origin O, the damper device 26 causing an asymmetric change is also employable. From the relationship between the input torque Tin and the twist angle Φ, the characteristics related to the rigidity value K, the hysteresis value H, and the backlash value G respectively shown in FIGS. 4 to 6 can be identified.

Figure 4:
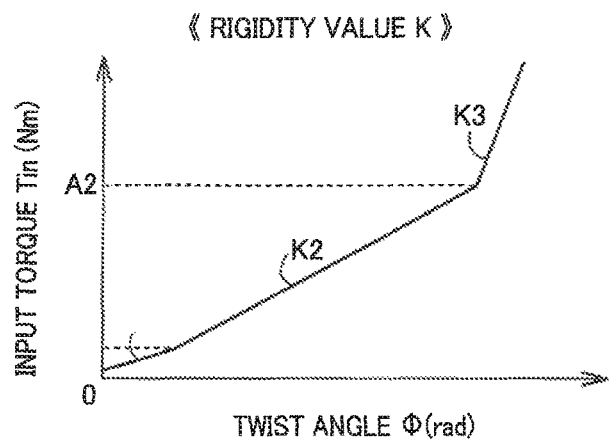
FIG. 4 is a view illustrating a change characteristic of rigidity of the damper device obtained from the relationship of FIG. 3.

The rigidity value K (Nm/rad) is a change (gradient) of the twist angle Φ relative to a change of the input torque Tin and FIG. 4 shows three kinds K1, K2, K3 of a rigidity value such that the rigidity value changes at two change points A1, A2 different in the input torque Tin. Therefore, the rigidity value is K1 in a region of the input torque Tin equal to or less than A1, the rigidity value is K2 in a region from A1 to A2, and the rigidity value is K3 in a region greater than A2. For example, at least one of the values K1, K2, K3 or an average value thereof etc. are used as the rigidity value K.

Figure 5:
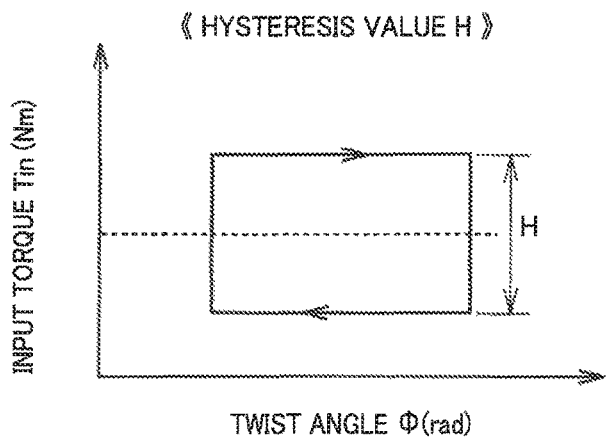
FIG. 5 is a view illustrating a change characteristic of a hysteresis value of the damper device obtained from the relationship of FIG. 3.

The hysteresis value H (Nm) of FIG. 5 is a deviation of the input torque Tin when the twist angle Φ increases and decreases and is obtained by offsetting an amount corresponding to the rigidity and extracting only the deviation.

Figure 6:
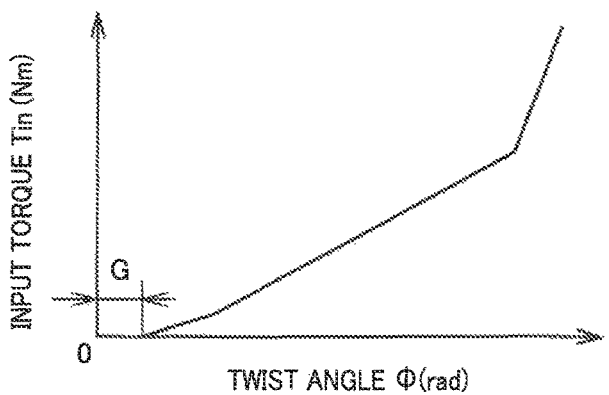
FIG. 6 is a view illustrating a change characteristic of a backlash value of the damper device obtained from the relationship of FIG. 3.

The backlash value G (rad) of FIG. 6 is a change amount of the twist angle Φ at the time of reversal between positive and negative in the input torque Tin and is an amount of a play between the input-side rotating element 26a and the output-side rotating element 26b of the damper device 26.

The damper rotational characteristic detecting portion 92 detects the twist angle Φ when the torque Tin is input from the first electric motor MG1 to the output-side rotating element 26b of the damper device 26 while the input-side rotating element (engine-side rotating element) 26a of the damper device 26 is fixed to the meshing brake 36 functioning as an engine-side rotating element fixing device of the present invention, thereby repeatedly calculates (measures) at least one of actual rotational characteristic values of the damper device 26, i.e., the actual rigidity value K, the actual hysteresis value H, and the actual backlash value G at predetermined intervals or at the time of completion of running of a certain running distance etc., and sequentially stores the value in the damper rotational characteristic storage portion 94.

The damper rotational characteristic storage portion 94 has preset initial setting values Ki, Hi, Gi stored therein for the rotational characteristic values, i.e., at least one of the rigidity value K, the hysteresis value H, and the backlash value G These initial setting values Ki, Hi, Gi are values initially preset at the time of manufacturing, factory shipment, or sale by a dealer, as values on the most disadvantageous side in terms of occurrence of vibration such as rattling noise and tooth-hitting noise in consideration of design tolerances, or variations in the values detected by the damper rotational characteristic detecting portion 92, when preset initial conditions are satisfied.

Based on a difference between the rotational characteristic value of the damper device 26 and the preset initial setting value of the rotational characteristic value of the damper device 26, the output torque correction control portion 96 corrects and controls the output torque Te of the engine 12 or the output torque Tm1 of the first electric motor MG1 to suppress occurrence of vibration such as the tooth-hitting noise and the engine start shock.

Figure 7:
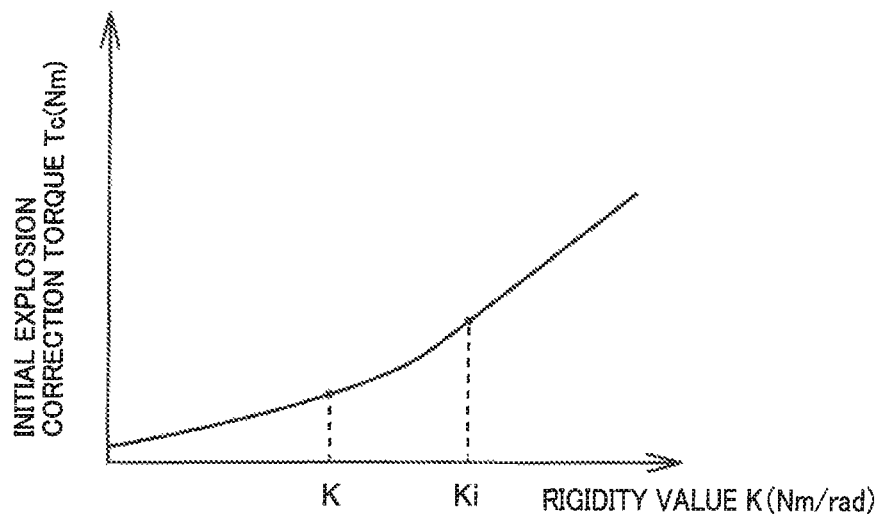
FIG. 7 is a diagram (map) showing a relationship between a preset initial explosion correction torque and a rigidity value in an electronic control device of FIG. 1.

For example, to suppress noise or vibration referred to as tooth-hitting noise at the engine start, the output torque correction control portion 96 determines an initial explosion correction torque Tc based on the actual rigidity value K detected by the damper rotational characteristic detecting portion 92 from a preset relationship (map) shown in FIG. 7, for example, and adds this initial explosion correction torque Tc to a base value of a cranking torque Tk from the first electric motor MG1 calculated in accordance with a vehicle mode (an acceleration request mode, a warm-up mode, a charge mode, etc.) at the time of a start request of the engine 12 during electric-motor running, for example. The initial explosion correction torque Tc is determined in accordance with a difference of the actual rigidity value K from the initial value Ki shown in FIG. 7, and as the actual rigidity value K becomes lower than the initial value Ki, the initial explosion correction torque Tc is determined as a smaller value.

For example, to suppress noise or vibration such as rattling noise during running, when the actual rigidity value K detected by the damper rotational characteristic detecting portion 92 is larger than the preset initial setting value Ki of the rigidity value, the output torque correction control portion 96 decreases the output torque Te of the engine 12 with the rotation speed Ne of the engine 12 in operation kept constant, and when the actual rigidity value K is smaller than the preset initial setting value Ki, the output torque correction control portion 96 increases the output torque Te of the engine 12 with the rotation speed Ne of the engine 12 in operation kept constant.

Figure 8:
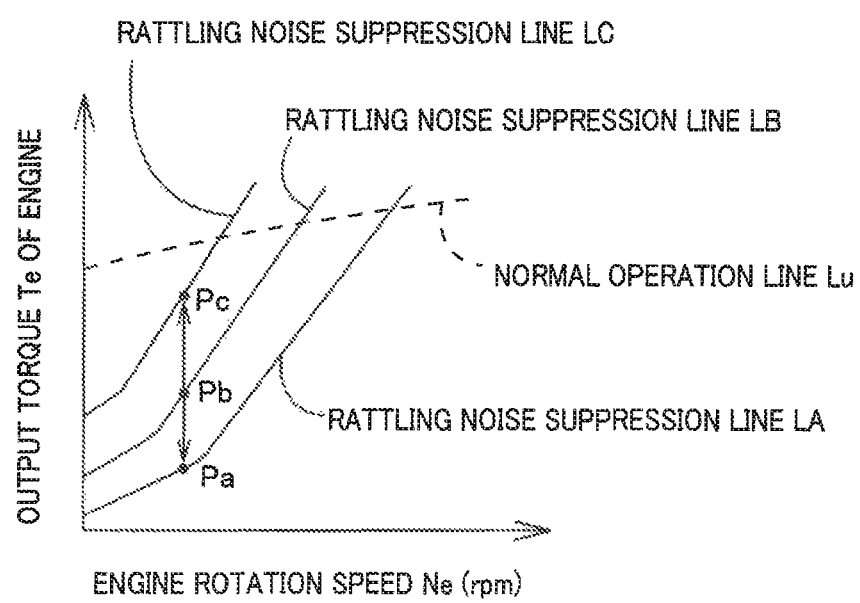
FIG. 8 is a diagram showing a rattling noise suppression line switched by the electronic control device of FIG. 1.

Specifically, as shown in FIG. 8, when the actual rigidity value K is equivalent to the preset initial setting value Ki of the rigidity value, an ordinary rattling noise suppression line LB is used; however, when the actual rigidity value K is larger than the preset initial setting value Ki of the rigidity value, the ordinary rattling noise suppression line LB is switched to a low-torque-side rattling noise suppression line LA set on the lower torque side, and an operating point of the engine 12 is set on the low-torque-side rattling noise suppression line LA without changing the rotation speed Ne of the engine 12 in operation. When the actual rigidity value K is smaller than the preset initial setting value Ki of the rigidity value, the ordinary rattling noise suppression line LB is switched to a high-torque-side rattling noise suppression line LC set on the higher torque side, and the operating point of the engine 12 is set on the high-torque-side rattling noise suppression line LC without changing the rotation speed Ne of the engine 12 in operation.

Therefore, for example, when the operating point of the engine 12 is a point Pb i.e., the actual rigidity value K is equivalent to the preset initial setting value Ki of the rigidity value, and the actual rigidity value K is larger than the preset initial setting value Ki of the rigidity value, torque control is executed such that the operating point of the engine 12 is shifted from the point Pb to a point Pa without changing the rotation speed Ne of the engine 12, and if the actual rigidity value K is smaller than the preset initial setting value Ki of the rigidity value, torque control is executed such that the operating point of the engine 12 is shifted from the point Pb to a point Pc without changing the rotation speed Ne of the engine 12.

For example, to suppress noise or vibration such as rattling noise during running, when the actual hysteresis value H detected by the damper rotational characteristic detecting portion 92 is smaller than the preset initial setting value Hi, the output torque correction control portion 96 decreases the output torque Te of the engine 12 with the rotation speed Ne of the engine 12 in operation kept constant, and when the actual hysteresis value H is larger than the preset initial setting value Hi, the output torque correction control portion 96 increases the output torque Te of the engine 12 with the rotation speed Ne of the engine 12 in operation kept constant.

Specifically, as shown in FIG. 8, when the actual hysteresis value H is equivalent to the preset initial setting value Hi of the hysteresis value H, an ordinary rattling noise suppression line LB is used. However, when the actual hysteresis value H is smaller than the preset initial setting value Hi of the hysteresis value H, the ordinary rattling noise suppression line LB is switched to a low-torque-side rattling noise suppression line LA set on the lower torque side, and the operating point of the engine 12 is set on the low-torque-side rattling noise suppression line LA without changing the rotation speed Ne of the engine 12 in operation. When the actual hysteresis value H is larger than the preset initial setting value Hi of the hysteresis value H, the ordinary rattling noise suppression line LB is switched to a high-torque-side rattling noise suppression line LC set on the higher torque side, and the operating point of the engine 12 is set on the high-torque-side rattling noise suppression line LC without changing the rotation speed Ne of the engine 12 in operation.

Therefore, as shown in FIG. 8, for example, when the operating point of the engine 12 is the point Pb when the actual hysteresis value H is equivalent to the preset initial setting value Hi of the hysteresis value H, if the actual hysteresis value H is smaller than the preset initial setting value Hi of the hysteresis value H, torque control is executed such that the operating point of the engine 12 is shifted from the point Pb to the point Pa without changing the rotation speed Ne of the engine 12, and if the actual hysteresis value H is larger than the preset initial setting value Hi of the hysteresis value H, a torque is controlled such that the operating point of the engine 12 is shifted from the point Pb to the point Pc without changing the rotation speed Ne of the engine 12.

In FIG. 8, a normal operation line Lu indicated by a broken line is a target operation line experimentally obtained in advance to operate the engine 12 such that both a driving performance and a fuel consumption performance are satisfied. On the other hand, the rattling noise suppression line LA, LB, LC is an operation line experimentally obtained in advance to set the engine rotation speed Ne higher than the normal operation line Lu so as to avoid an area in which a tooth-hitting noise, i.e., a rattling noise, is likely to occur during operation of the engine 12. The ordinary rattling noise suppression line LB is set at the time of a maximum value among the tolerances (variations) of the rigidity of the springs 32 of the damper device 26. When the engine rotation speed Ne enters a low rotation region and the engine output torque Te enters the low output torque region, the normal operation line Lu for operating the engine 12 is switched to any one of the rattling noise suppression lines LA, LB, LC. In this example, the ordinary rattling noise suppression line LB is set as an ordinary rattling noise suppression line along with the rattling noise suppression line LA set on the lower torque side than the ordinary rattling noise suppression line LB and the rattling noise suppression line LC set on the higher torque side than the ordinary rattling noise suppression line LB.

Figure 9:
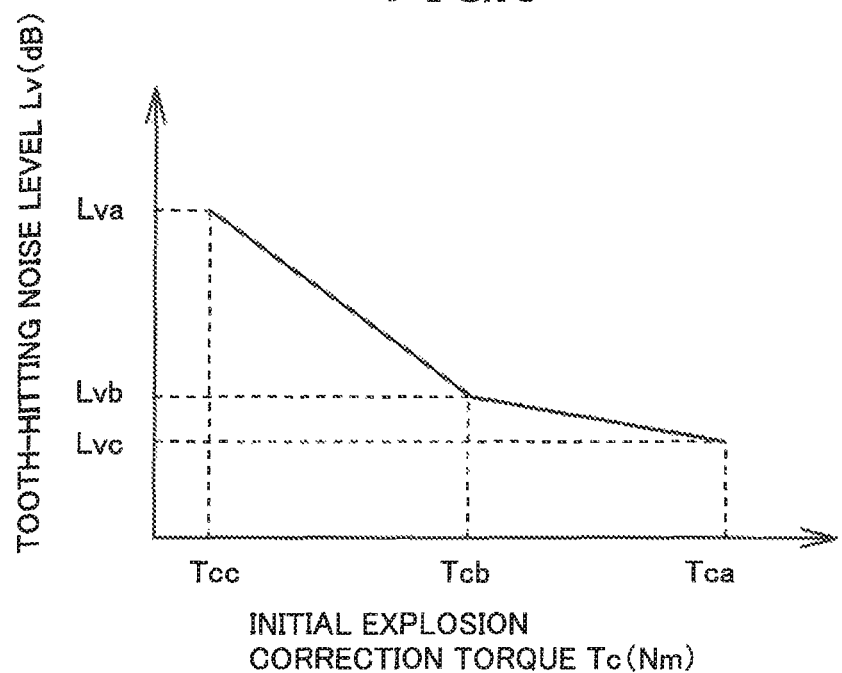
FIG. 9 shows a relationship between the initial explosion correction torque, which is controlled by the electronic control device of FIG. 1, and a tooth-hitting noise level.
Figure 10:
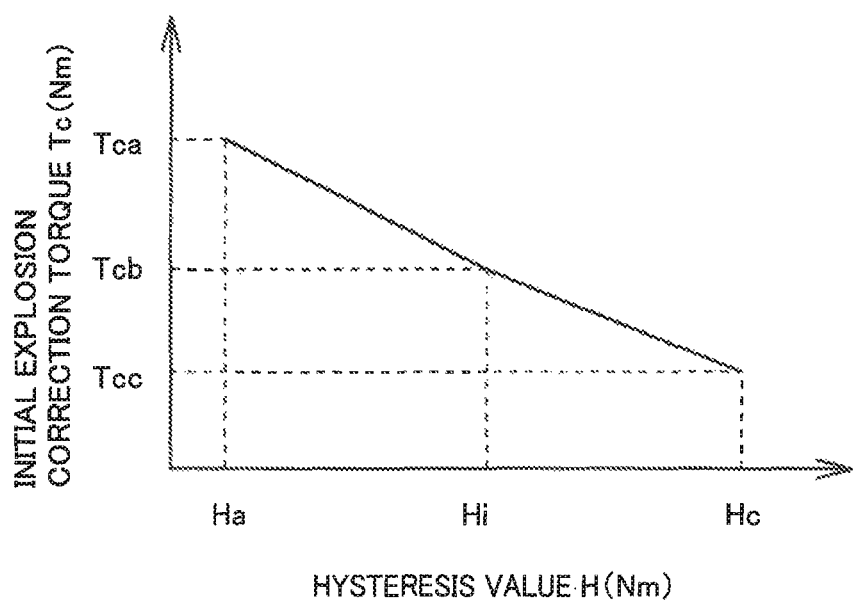
FIG. 10 shows a preliminarily stored relationship between the initial explosion correction torque, which is controlled by the electronic control device of FIG. 1, and the hysteresis value.

FIG. 9 shows a relationship between the initial explosion correction torque Tc (Nm) required for suppressing the tooth-hitting noise generated at the time of cranking and a tooth-hitting noise level Lv (dB) generated at the time of cranking, which shows that when the initial explosion correction torque Tc becomes larger, the tooth-hitting noise level Lv (dB) becomes smaller. FIG. 10 shows a preliminarily stored relationship between the initial explosion correction torque Tc and the hysteresis value H of the damper device 26 that as the hysteresis value H of the damper device 26 becomes larger, the initial explosion correction torque Tc becomes smaller.

For example, to suppress the tooth-hitting noise or the start shock generated at the time of cranking of the engine 12 by the first electric motor MG1, when the actual hysteresis value H detected by the damper rotational characteristic detecting portion 92 is larger than the preset initial setting value Hi, the output torque correction control portion 96 reduces the initial explosion correction torque Tc required for suppressing the tooth-hitting noise generated at the time of cranking for starting the engine 12 during the electric-motor running using the second electric motor MG2, and when the hysteresis value H is smaller than the preset initial setting value Hi, the output torque correction control portion 96 increases the initial explosion correction torque Tc.

Specifically, when the actual hysteresis value H is equivalent to the initial setting value Hi, the output torque correction control portion 96 does not change (correct) the cranking torque Tk from the first electric motor MG1 for cranking the engine 12; however, when the actual hysteresis value H is larger than the preset initial setting value Hi of the hysteresis value H, for example, when the actual hysteresis value H increases to a value Hc from the relationship of FIG. 10, the output torque correction control portion 96 reduces the initial explosion correction torque Tc to a value Tcc. Conversely, when the actual hysteresis value H is smaller than the preset initial setting value Hi of the hysteresis value H, for example, when the actual hysteresis value H decreases to a value Ha from the relationship of FIG. 10, the output torque correction control portion 96 increases the initial explosion correction torque Tc to a value Tca. The initial explosion correction torque Tc determined in this way is added to the base value of the cranking torque Tk of the first electric motor MG1 calculated in accordance with the vehicle mode (the acceleration request mode, the warm-up mode, the charge mode, etc.) at the time of the start request of the engine 12 during the electric-motor running, for example.

For example, to suppress the tooth-hitting noise or the start shock generated at the time of cranking of the engine 12 by the first electric motor MG1 to perform cranking smoothly and as quickly as possible for the backlash value G of the damper device 26 at the start of the engine 12, the output torque correction control portion 96 makes a torque increase rate of the cranking torque Tk output from the first electric motor MG1 larger when the actual backlash value G of the damper device 26 detected by the damper rotational characteristic detecting portion 92 is larger than the preset initial setting value Gi, and the output torque correction control portion 96 makes the torque increase rate of the cranking torque Tk smaller when the backlash value G is smaller than the preset initial setting value Gi, so that.

Figure 11:
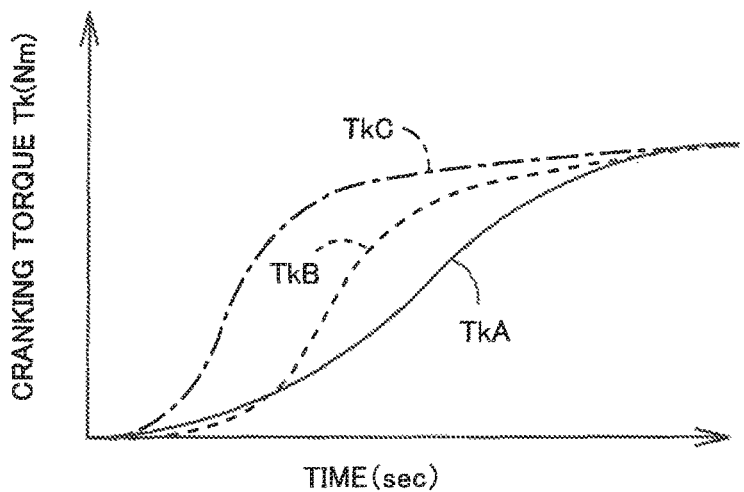
FIG. 11 is a diagram showing an increase rate of a cranking torque switched by the electronic control device of FIG. 1.

Specifically, when the actual backlash value G of the damper device 26 detected by the damper rotational characteristic detecting portion 92 is equivalent to the preset initial setting value Gi, the output torque correction control portion 96 sets the cranking torque Tk to a torque increase rate indicated by a broken line TkB of FIG. 11; however, when the actual backlash value G is larger than the preset initial setting value Gi, the output torque correction control portion 96 makes the torque increase rate of the cranking torque Tk relatively larger than the line TkB as indicated by a dashed dotted line TkC of FIG. 11, and when the backlash value G is smaller than the preset initial setting value Gi, the output torque correction control portion 96 makes the torque increase rate of the cranking torque Tk relatively smaller than the line TkB as indicated by a solid line TkA of FIG. 11.

Figure 12:
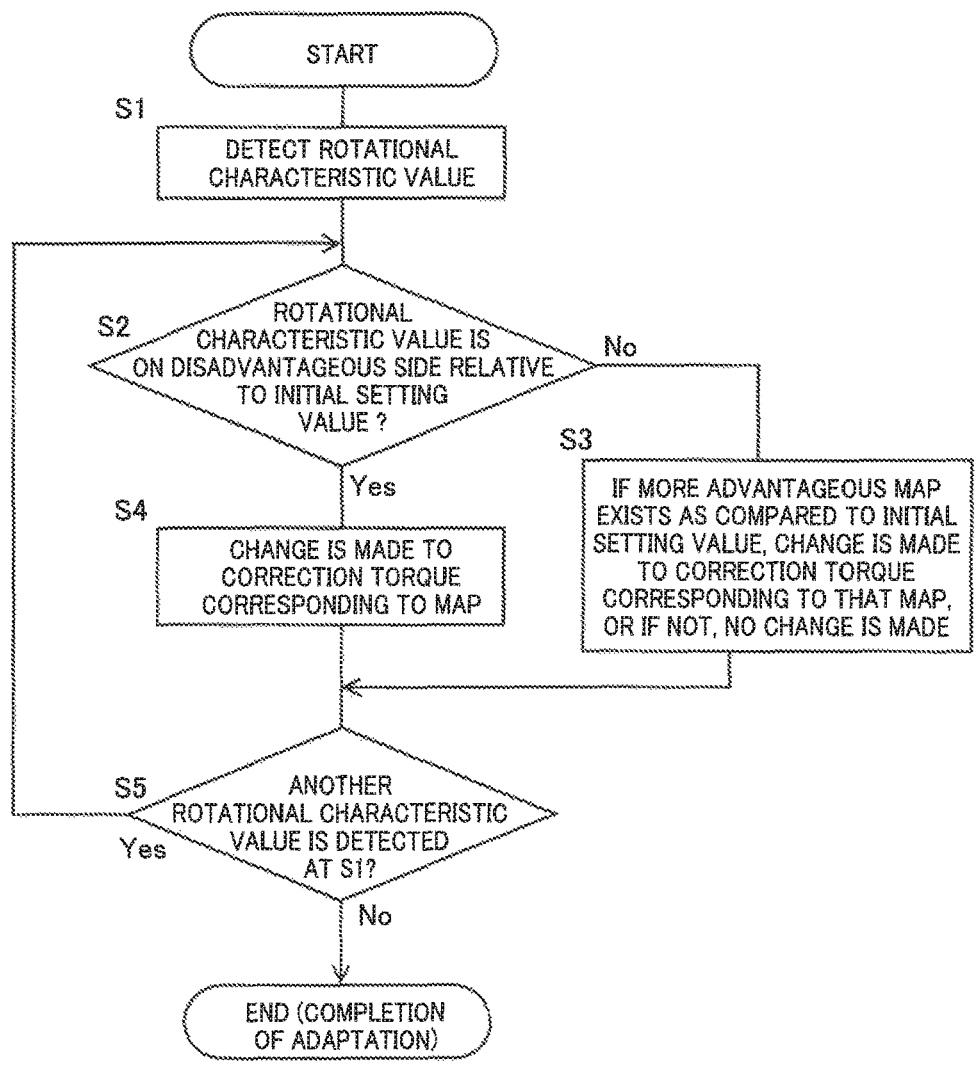
FIG. 12 is a flowchart for explaining main portions of an example of the control operation of the electronic control device of FIG. 1.

FIG. 12 is a flowchart for explaining main portions of an example of the control operation of the electronic control device 90. In FIG. 12, when a rotational characteristic value of the damper device 26 is detected at step S1 (hereinafter referred to as S1) corresponding to the damper rotational characteristic detecting portion 92, S2 to S5 corresponding to the output torque correction control portion 96 are executed. At S2, it is determined whether the rotational characteristic value detected at S1 is on the disadvantageous side relative to the initial setting value of the rotational characteristic value in terms of occurrence of vibrations of the tooth-hitting noise etc. For example, when the rotational characteristic value is the actual hysteresis value H of the damper device 26, it is determined whether the value H is on the side where the vibrations of the tooth-hitting noise etc. become larger, relative to the initial setting value Hi.

In the case that the determination of S2 is negative, at S3, for example, if a more advantageous map exists as compared to when the correction torque corresponding to the initial setting value is used, the correction torque is changed based on the map. For example, if a value of initial explosion correction torque Tc can be obtained based on a map that is more advantageous as compared to when the initial explosion correction torque Tc corresponding to the initial setting value Hi is used, the initial explosion correction torque Tc is corrected (changed) to the value.

However, if the determination of S2 is affirmative, at S4, the correction torque is changed based on the actual rotational characteristic value and the map stored in advance. For example, the initial explosion correction torque Tc is determined based on the actual hysteresis value H from the preliminarily stored relationship. For example, the initial explosion correction torque Tc is determined based on the actual hysteresis value H from the preliminarily stored relationship shown in FIG. 7. In FIG. 7, when the actual hysteresis value H is smaller than the initial setting value Hi and is on the disadvantageous side, a smaller value is determined for the initial explosion correction torque Tc as compared to when the initial explosion correction torque Tc corresponding to the initial setting value Hi is used.

Regarding selection of the rattling noise suppression line, as shown in FIG. 8, when the actual hysteresis value H is equivalent to the preset initial setting value Hi, the ordinary rattling noise suppression line LB is used.

However, when the actual hysteresis value H is smaller than the preset initial setting value Hi, the ordinary rattling noise suppression line LB is switched to the low-torque-side rattling noise suppression line LA set on the lower torque side, and the operating point of the engine 12 is set on the low-torque-side rattling noise suppression line LA without changing the rotation speed Ne of the engine 12 in operation.

When the actual hysteresis value H is larger than the preset initial setting value Hi, the ordinary rattling noise suppression line LB is switched to the high-torque-side rattling noise suppression line LC set on the higher torque side, and the operating point of the engine 12 is set on the high-torque-side rattling noise suppression line LC without changing the rotation speed Ne of the engine 12 in operation.

At S5, it is determined whether another rotational characteristic is detected at S1. If the determination of S5 is affirmative, S2 and subsequent steps are executed, and if the determination is negative, this routine is terminated.

Figure 13:
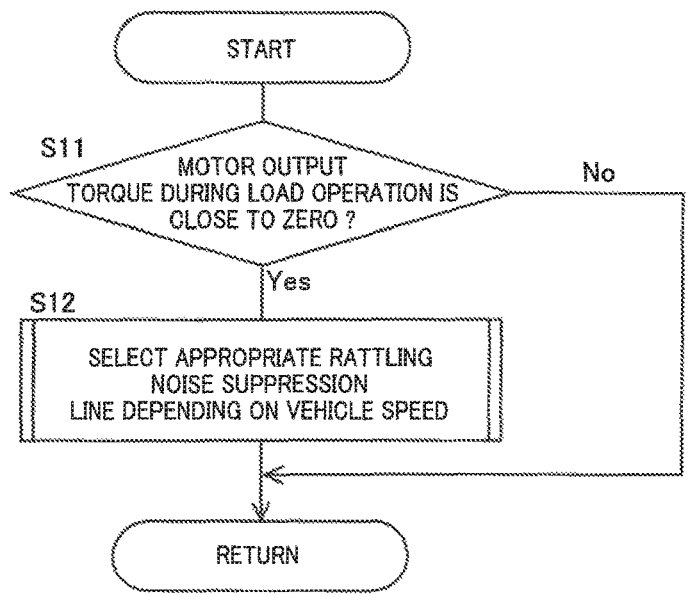
FIG. 13 is a flowchart for explaining main portions of an example of the control operation of the electronic control device of FIG. 1.
Figure 14:
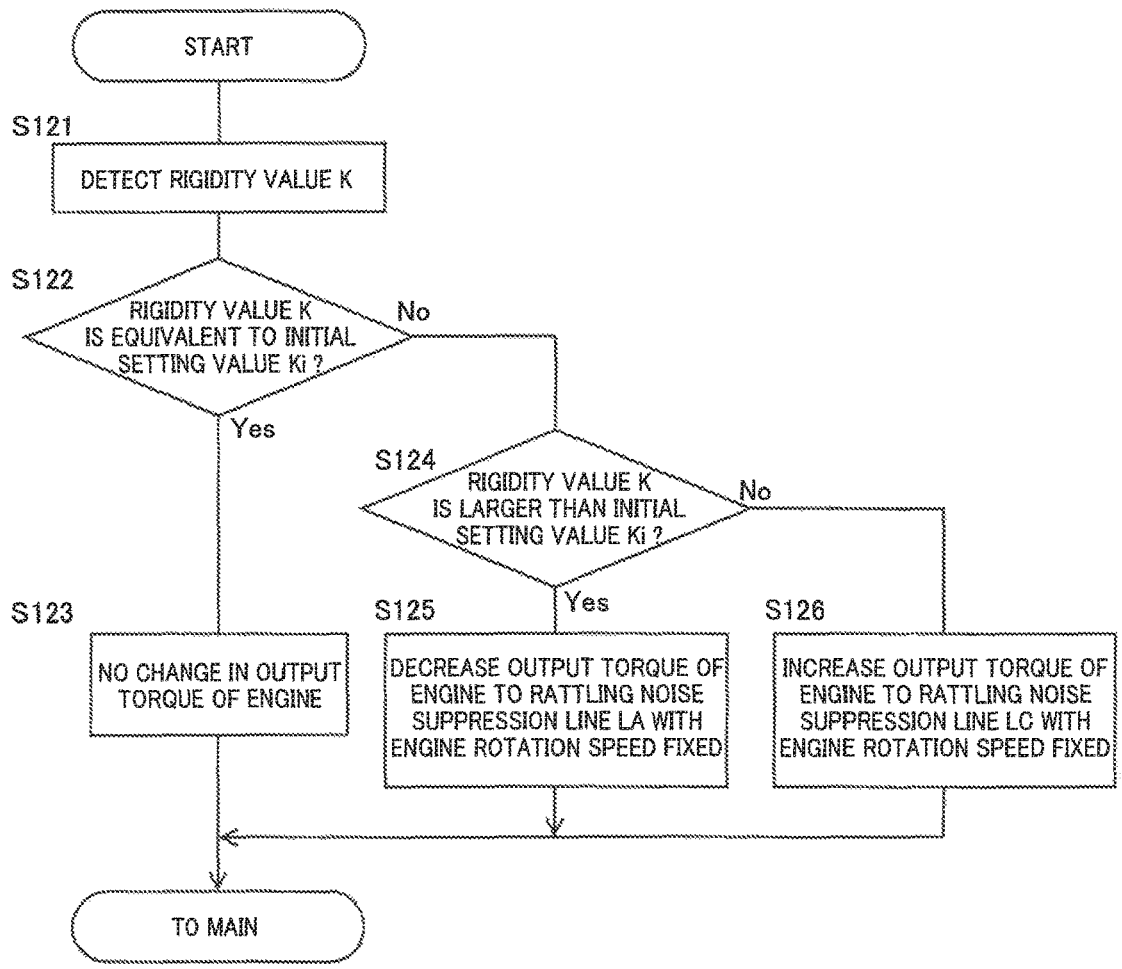
FIG. 14 is a flowchart for explaining the routine of step S12 shown in FIG. 13.

To optimize the output torque Te of the engine 12 in accordance with the actual rigidity value K of the damper device 26 and suppress the occurrence of the rattling noise during operation of the engine 12, the electronic control device 90 can provide control shown in FIGS. 13 and 14.

At S11 of FIG. 13, it is determined whether the vehicle running status is in the rattling noise generation region when an accelerator pedal is returned during running of the vehicle 10. The determination is made for example, based on whether the output torque Tm2 of the second electric motor MG2 comes close to zero (Nm) while the vehicle 10 is running. If the determination of S11 is negative, this routine is terminated, and if the determination of S11 is affirmative, at S12, an appropriate rattling noise suppression line corresponding to the vehicle speed V is selected.

FIG. 14 is a flowchart for explaining the routine of S12. In FIG. 14, when the actual rigidity value K of the damper device 26 is detected as one of the rotational characteristic values at S121 corresponding to the damper rotational characteristic detecting portion 92, S122 to S126 corresponding to the output torque correction control portion 96 are executed.

At S122, it is determined whether the actual rigidity value K detected at S121 is equivalent to the preset initial setting value Ki. If the determination of S122 is affirmative, the output torque control of the engine 12 is not changed at S123. Specifically, this is the case that the actual rigidity value K is equivalent to the preset initial setting value Ki of the rigidity value K, and therefore, for example, the operating point of the engine 12 is maintained at the point Pb on the rattling noise suppression line LB of FIG. 8. However, if the determination of S122 is negative, it is determined at S124 whether the actual rigidity value K is larger than the preset initial setting value Ki.

If the determination of S124 is affirmative, this is the case that the actual rigidity value K is larger than the preset initial setting value Ki of the rigidity value K, and therefore, at S125, the torque Te of the engine 12 is controlled such that the operating point of the engine 12 is shifted from the point Pb to the point Pa on the rattling noise suppression line LA without changing the rotation speed Ne of the engine 12 as shown in FIG. 8.

However, if the determination of S124 is negative, this is the case that the actual rigidity value K is smaller than the preset initial setting value Ki of the rigidity value K, and therefore, at S126, the torque Te of the engine 12 is controlled such that the operating point of the engine 12 is shifted from the point Pb to the point Pc on the rattling noise suppression line LC without changing the rotation speed Ne of the engine 12.

Figure 15:
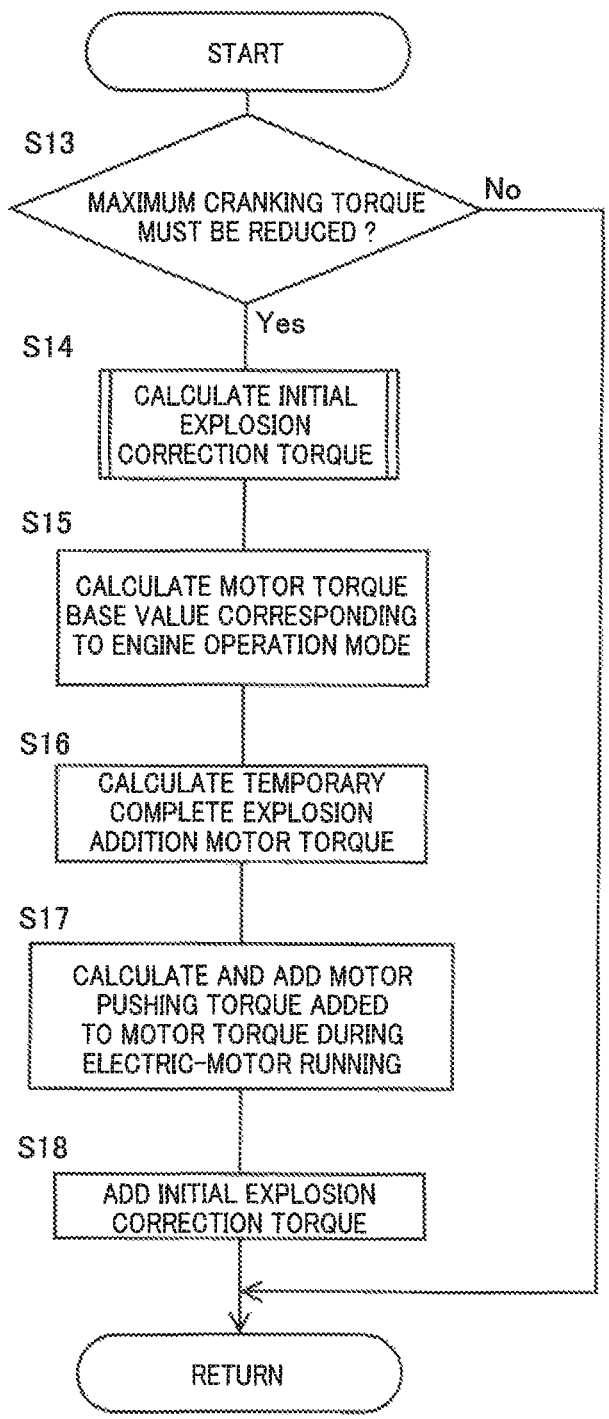
FIG. 15 is a flowchart for explaining main portions of an example of the control operation of the electronic control device of FIG. 1.
Figure 16:
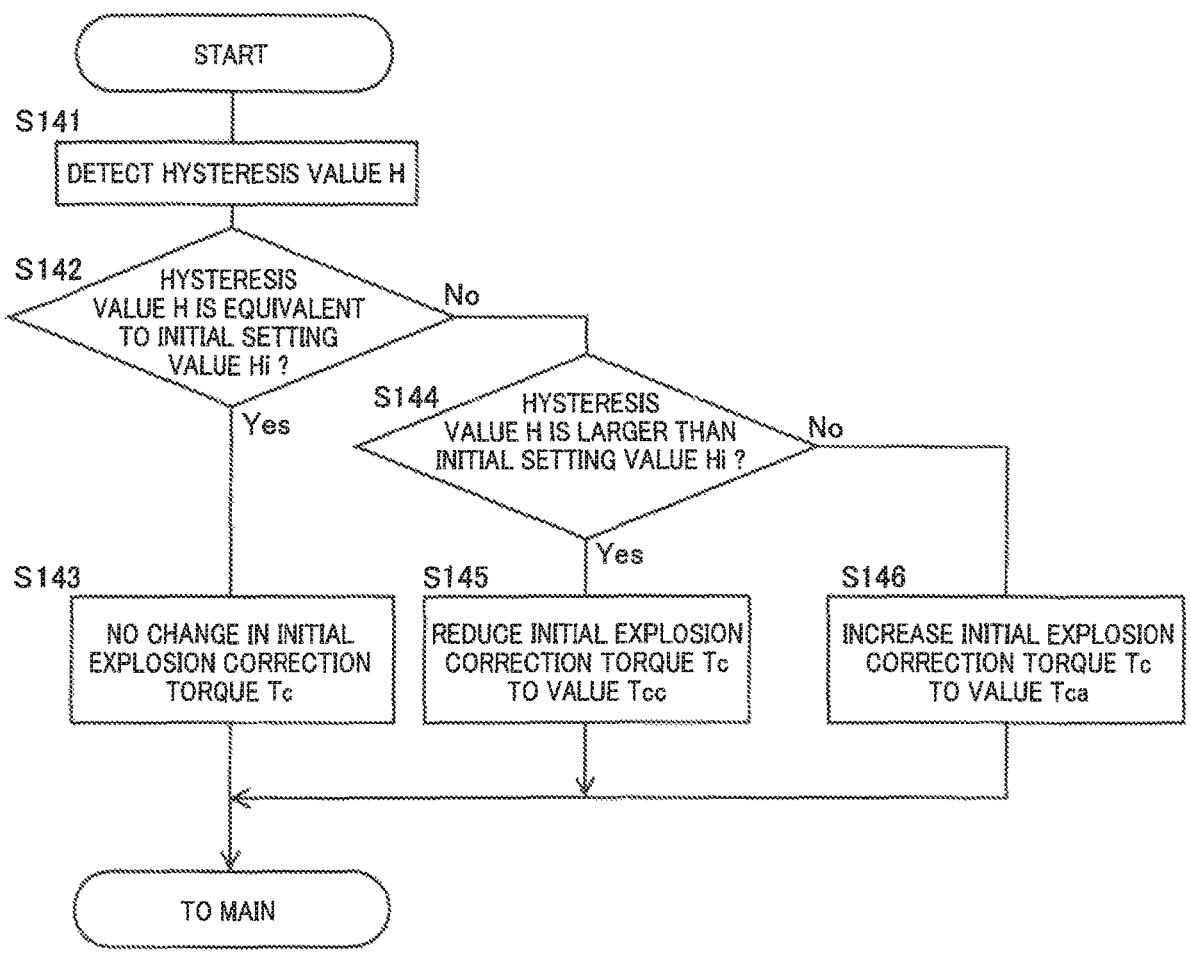
FIG. 16 is a flowchart for explaining the routine of step S14 shown in FIG. 15.

To optimize the cranking torque Tk from the first electric motor MG1 for cranking the engine 12 in accordance with the actual hysteresis value H and suppress the tooth-hitting noise and the start shock, the electronic control device 90 can provide control shown in FIGS. 15 and 16.

At S13 of FIG. 15, it is determined whether the maximum value of the cranking torque Tk is reduced by the initial explosion correction torque Tc. If the determination of S13 is negative, this routine is terminated, and if the determination of S13 is affirmative, the process shown in FIG. 16 is executed at S14 to calculate the initial explosion correction torque Tc based on the actual hysteresis value H.

In FIG. 16, when the actual hysteresis value H of the damper device 26 is detected as one of the rotational characteristic values at S141 corresponding to the damper rotational characteristic detecting portion 92, S142 to S146 corresponding to the output torque correction control portion 96 are executed.

At S142, it is determined whether the actual hysteresis value H is equivalent to the preset initial setting value Hi of the hysteresis value H. If the determination of S142 is affirmative, at S143, the initial explosion correction torque Tc is maintained at a value Tcb of FIG. 10 and no change is made to the cranking torque Tk from the first electric motor MG1 to which this value is added as described later. However, if the determination of S142 is negative, it is determined at S144 whether the actual hysteresis value H is larger than the preset initial setting value Hi.

If the determination of S144 is affirmative, this is the case that the actual hysteresis value H is larger than the preset initial setting value Hi, and therefore, at S145, the initial explosion correction torque Tc is reduced to the value Tcc shown in FIG. 10, for example.

Conversely, if the determination of S144 is negative, this is the case that the actual hysteresis value H is smaller than the preset initial setting value Hi, and therefore, the torque Tc is increased to the value Tca of FIG. 10.

Returning to FIG. 15, at S15, a motor torque base value of the second electric motor MG2 outputting a drive torque of the vehicle 10 is calculated from a preset relationship based on an engine operation mode such as the acceleration request mode, the charge mode, and the warm-up mode.

Subsequently, at S16, a temporary complete explosion addition motor torque at complete explosion is calculated as the output torque Tm2 of the second electric motor MG2 acquired by adding an expected torque at the time of complete explosion of the engine 12 to the motor torque base value of the second electric motor MG2 calculated at S15.

Subsequently, at S17, a pushing torque for eliminating the backlash added to the output torque of the second electric motor MG2 performing electric-motor running is calculated for eliminating an influence of a reaction force generated at the time of engine start by the first electric motor MG1 and is added to the temporary addition motor torque at complete explosion calculated at S16.

At S18, the initial explosion correction torque Tc calculated at S14 is added to the torque value calculated at S17. With the cranking torque Tk after the addition, the engine 12 is cranked by the first electric motor MG1.

To optimize the cranking torque Tk from the first electric motor MG1 at the time of cranking of the engine 12 in accordance with the actual backlash value G and suppress the tooth-hitting noise and the start shock, the electronic control device 90 can provide control shown in FIG. 17. When the actual backlash value G of the damper device 26 is detected as one of the rotational characteristic values at step S19 in FIG. 17 corresponding to the damper rotational characteristic detecting portion 92, S20 to S24 corresponding to the output torque correction control portion 96 are executed.

At S20, it is determined whether the actual backlash value G detected at S19 is equivalent to the preset initial setting value Gi.

If the determination of S20 is affirmative, the cranking torque Tk output by the first electric motor MG1 is not changed at S21. Specifically, this is the case that the actual backlash value G is equivalent to the preset initial setting value Gi of the backlash value and therefore, the cranking torque characteristic TkB is selected for the cranking torque Tk of FIG. 11, for example.

However, if the determination of S20 is negative, it is determined at S22 whether the actual backlash value G is larger than the preset initial setting value Gi.

If the determination of S22 is affirmative, this is the case that the actual backlash value G is larger than the preset initial setting value Gi of the backlash value G, and therefore, at S23, the cranking torque characteristic TkC rising faster (having a larger torque rate) than the cranking torque characteristic TkB is selected as shown in FIG. 11. As a result, backlash is quickly eliminated.

However, if the determination of S22 is negative, this is the case that the actual backlash value G is smaller than the preset initial setting value Gi of the backlash value G, and therefore, at S24, the cranking torque characteristic TkA rising later (having a smaller torque rate) than the cranking torque characteristic TkB is selected.

As described above, according to the electronic control device 90 of the hybrid vehicle 10 of this example, the output torque correction control portion 96 controls the output torque of the drive power source such as the engine 12, the first electric motor MG1, and the second electric motor MG2 to suppress occurrence of vibration such as the tooth-hitting noise and the engine start shock based on a difference between the rotational characteristic value of the damper device 26 detected by the damper rotational characteristic detecting portion 92 and the preset initial setting value of the rotational characteristic value of the damper device 26. As a result, regardless of a change in the rotational characteristic value of the damper device 26, the occurrence of vibration such as the tooth-hitting noise and the engine start shock is suppressed, and a deterioration in vehicle drivability is suppressed.

According to the electronic control device 90 of the hybrid vehicle 10 of this example, the hybrid vehicle 10 includes the meshing brake (engine-side rotating element fixing device) 36 stopping rotation of the input-side rotating element (engine-side rotating element) 26a of the damper device 26, and the damper rotational characteristic detecting portion 92 measures the rotational characteristic value of the damper device 26 by allowing the first electric motor MG1 to input a torque while the input-side rotating element 26a of the damper device 26 is fixed to the meshing brake 36. As a result, the rotational characteristic value of the damper device 26 is accurately measured.

According to the electronic control device 90 of the hybrid vehicle 10 of this example, the rotational characteristic value of the damper device 26 is any one of the rigidity value K that is a rate of the twist angle Φ to the input torque Tin of the damper device 26, the hysteresis value H of the twist angle Φ for the input torque Tin, and the backlash value G indicative of a dead zone of the twist angle Φ for the input torque Tin, and therefore, the torque control is properly provided based on the rotational characteristic value regardless of a change in any of the rigidity value K, the hysteresis value H, and the backlash value G of the damper device 26.

According to the electronic control device 90 of the hybrid vehicle 10 of this example, when the rigidity value K is larger than the preset initial setting value Ki, the output torque correction control portion 96 decreases the output torque Te of the engine 12 with the rotation speed Ne of the engine 12 kept constant, and when the rigidity value K is smaller than the preset initial setting value Ki, the output torque correction control portion 96 increases the output torque Te of the engine 12 with the rotation speed Ne of the engine 12 kept constant. As a result, even if the rigidity value K of the damper device 26 changes, the occurrence of the rattling noise and tooth-hitting noise is suppressed, and preferable fuel consumption of the vehicle 10 is achieved.

According to the electronic control device 90 of the hybrid vehicle 10 of this example, when the hysteresis value H is larger than the preset initial setting value Hi, the output torque correction control portion 96 reduces the initial explosion correction torque Tc output from the first electric motor MG1 for starting the engine 12 during electric-motor running of the vehicle 10, and when the hysteresis value H is smaller than the preset initial setting value Hi, the output torque correction control portion 96 increases the initial explosion correction torque Tc output from the first electric motor MG1 for starting the engine 12 during the electric-motor running. As a result, even if the hysteresis value H of the damper device 26 changes, an appropriate engine start torque is obtained, so that the initial explosion of the engine 12 is properly performed without an engine start shock.

According to the electronic control device 90 of the hybrid vehicle 10 of this example, when the backlash value G is larger than the preset initial setting value Gi, the output torque correction control portion 96 makes the torque increase rate of the torque output from the first electric motor MG1 larger, so that the backlash of the damper device 26 is eliminated smoothly and cranking of the engine 12 is performed as quickly as possible at the time of start of the engine 12, and when the backlash value G is smaller than the preset initial setting value Gi, the output torque correction control portion 96 makes the torque increase rate of the torque output from the first electric motor MG1 smaller, so that the backlash of the damper device 26 is eliminated before starting the engine 12. As a result, even if the backlash value G of the damper device 26 changes, the engine 12 is started after the backlash is eliminated smoothly and as quickly as possible, so that the engine 12 can smoothly be started.

Although the example of the present invention has been described in detail with reference to the drawings, this is merely an embodiment and the present invention can be implemented in variously modified and improved forms based on the knowledge of those skilled in the art.

REFERENCE SIGNS LIST

10: hybrid vehicle
12: engine
24: crankshaft
26: damper device
26a: input-side rotating element (engine-side rotating element)
36: meshing brake (engine-side rotating element fixing device)
90: electronic control device (control device)
92: damper rotational characteristic detecting portion
96: output torque correction control portion
G: backlash value
Gi: initial setting value
H: hysteresis value
Hi: initial setting value K: rigidity value
Ki: initial setting value
MG1: first electric motor (electric motor)
Tc: initial explosion correction torque
Te: output torque of the engine
Tm1: output torque of the electric motor
Tk: cranking torque
Tin: input torque
Φ: twist angle

What is claimed is:

1. A control device of a hybrid vehicle including an engine and an electric motor serving as drive power sources and a damper device disposed between the engine and the electric motor and having rotational characteristics related to an input torque, the control device comprising:
    a damper rotational characteristic detecting portion configured to measure a rotational characteristic value of the damper device by allowing the electric motor to input a torque to the damper device while rotation of a crankshaft of the engine is stopped; and
    an output torque correction control portion configured to control an output torque of the engine or the electric motor to suppress occurrence of vibration based on a difference between the rotational characteristic value of the damper device detected by the damper rotational characteristic detecting portion and a preset initial setting value of the rotational characteristic value of the damper device.

2. The control device of a hybrid vehicle according to claim 1, wherein
    the hybrid vehicle includes an engine-side rotating element fixing device stopping rotation of an engine-side rotating element of the damper device, and wherein
    the damper rotational characteristic detecting portion measures the rotational characteristic value of the damper device by allowing the electric motor to input a torque while the engine-side rotating element of the damper device is fixed to the engine-side rotating element fixing device.

3. The control device of a hybrid vehicle according to claim 1, wherein
    the rotational characteristic value of the damper device is any one of a rigidity value that is a rate of a twist angle to an input torque of the damper device, a hysteresis value of the twist angle for the input torque of the damper device, and a backlash value indicative of a dead zone of the twist angle for the input torque of the damper device.

4. The control device of a hybrid vehicle according to claim 2, wherein
    the rotational characteristic value of the damper device is any one of a rigidity value that is a rate of a twist angle to an input torque of the damper device, a hysteresis value of the twist angle for the input torque of the damper device, and a backlash value indicative of a dead zone of the twist angle for the input torque of the damper device.

5. The control device of a hybrid vehicle according to claim 3, wherein
    when the rigidity value is larger than the preset initial setting value, the output torque correction control portion decreases the output torque of the engine with the rotation speed of the engine kept constant, and wherein
    when the rigidity value is smaller than the preset initial setting value, the output torque correction control portion increases the output torque of the engine with the rotation speed of the engine kept constant.

6. The control device of a hybrid vehicle according to claim 4, wherein
    when the rigidity value is larger than the preset initial setting value, the output torque correction control portion decreases the output torque of the engine with the rotation speed of the engine kept constant, and wherein
    when the rigidity value is smaller than the preset initial setting value, the output torque correction control portion increases the output torque of the engine with the rotation speed of the engine kept constant.

7. The control device of a hybrid vehicle according to claim 3, wherein
    when the hysteresis value is larger than the preset initial setting value, the output torque correction control portion reduces an initial explosion correction torque output from the electric motor for starting the engine during electric-motor running, and wherein
    when the hysteresis value is smaller than the preset initial setting value, the output torque correction control portion increases the initial explosion correction torque output from the electric motor for starting the engine during the electric-motor running.

8. The control device of a hybrid vehicle according to claim 4, wherein
    when the hysteresis value is larger than the preset initial setting value, the output torque correction control portion reduces an initial explosion correction torque output from the electric motor for starting the engine during electric-motor running, and wherein
    when the hysteresis value is smaller than the preset initial setting value, the output torque correction control portion increases the initial explosion correction torque output from the electric motor for starting the engine during the electric-motor running.

9. The control device of a hybrid vehicle according to claim 3, wherein
    when the backlash value is larger than the preset initial setting value, the output torque correction control portion makes a torque increase rate of a cranking torque output from the electric motor larger, so that a backlash of the damper device is eliminated smoothly and cranking is performed as quickly as possible at the time of start of the engine, and wherein
    when the backlash value is smaller than the preset initial setting value, the output torque correction control portion makes the torque increase rate of the cranking torque output from the electric motor smaller.

10. The control device of a hybrid vehicle according to claim 4, wherein
    when the backlash value is larger than the preset initial setting value, the output torque correction control portion makes a torque increase rate of a cranking torque output from the electric motor larger, so that a backlash of the damper device is eliminated smoothly and cranking is performed as quickly as possible at the time of start of the engine, and wherein
    when the backlash value is smaller than the preset initial setting value, the output torque correction control portion makes the torque increase rate of the cranking torque output from the electric motor smaller.

* * * * *